Figure 1:
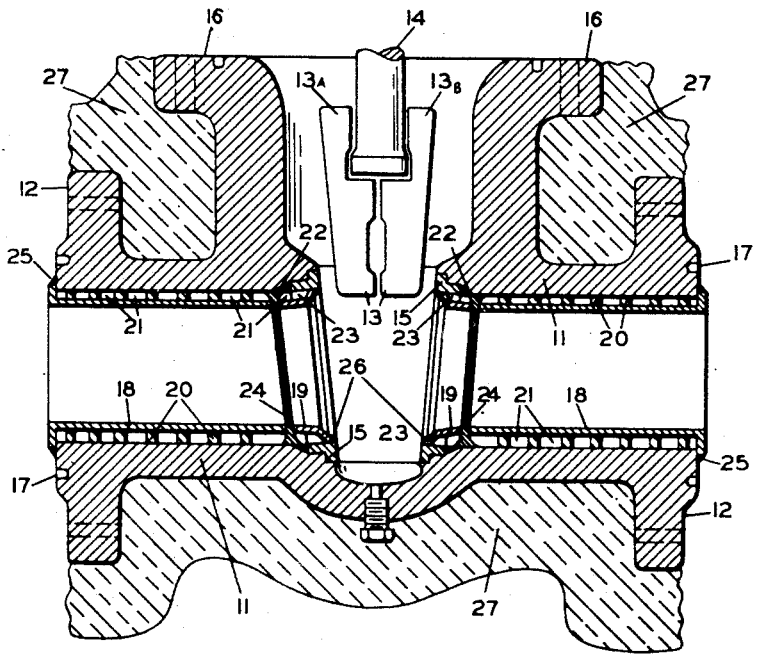

Feb. 14, 1950 S. D. LAWSON 2,497,780
REDUCING THERMAL SHOCK HIGH-TEMPERATURE VALVE
Filed April 27, 1945

INVENTOR
S. D. LAWSON
BY Hudson & Young
ATTORNEYS

Patented Feb. 14, 1950

2,497,780

UNITED STATES PATENT OFFICE 2,497,780

REDUCING THERMAL SHOCK HIGH-TEMPERATURE VALVE

Shelby D. Lawson, Bartlesville, Okla., assignor to Phillips Petroleum Company, a corporation of Delaware Application April 27, 1945, Serial No. 590,668

1 Claim. (Cl. 251—156)

This invention relates to valves. In one of its more specific aspects it relates to a means for the reduction of thermal shock in valves and fittings in high temperature service, particularly those on cyclic operation where the valves and fittings are subjected to alternate cooling and heating cycles.

It has been found that valves on processing units in the chemical and petroleum industries which are operated on cyclic processes where the valve is extremely hot (about 900° F. or higher) while in the open position and cool during the period the valve is closed, develop cracks in the bodies of the valves. Hydrocarbon catalytic cracking units in which relatively long cycle periods are encountered are good examples of services in which this type of stress corrosion is found.

Metallurgical research has not to date developed a satisfactory alloy to stand up under such stress conditions and at the same time withstand chemical corrosion. Metals or alloys must be used which withstand chemical corrosion and in many cases such alloys have rather high temperature coefficients of expansion, while some alloys having better thermal properties, unfortunately, are not sufficiently chemically resistant to permit their use for economic and safety reasons.

Such failures, that is cracks in valve bodies, are apparently caused by a cool valve being subjected to an extremely hot stream of fluid which heats the internal wall of the valve body to essentially fluid temperature while the outside wall is still cool. It can be readily seen that high compressional stresses will be set up in the internal section of the wall, the magnitude of these stresses varying with the wall thickness and the temperature differential across the wall section. The continual application of these stresses causes cracks to appear. In a case which has come to applicant's attention, cracks were discovered after a valve had been operated through only six cycles.

A partial solution to the problem resulted from careful exterior insulation of valves in such service. It seems as though such insulation prevented complete cooling of the valve during off-stream intervals so that upon opening to flow of hot fluid the valve was in a substantially preheated condition. One solution of the problem is apparent, in part covered by the exterior insulation, mentioned above, and further anticipated by maintaining the valve in a heated condition during off-stream periods from an extraneous source of heat. Valves have been preheated electrically and their life increased but such methods have been found to be expensive and not too satisfactory. I propose instead to solve the problem by protection of the valve body by novel construction of the interior of the valve.

Accordingly, an object of my invention is to provide valve bodies which will successfully withstand wide temperature variations.

Another object of my invention is to provide valves which will withstand such temperature changes as occasioned by off-stream to on-stream in high temperature cyclic operations.

Still another object of my invention is to provide a valve design and structure for valves which experience extreme temperature changes.

Yet another object of my invention is to provide a valve structure which will withstand extreme cyclic temperature changes when alloys resistant to chemical corrosion are used in the construction of the valve body.

Figure 2:
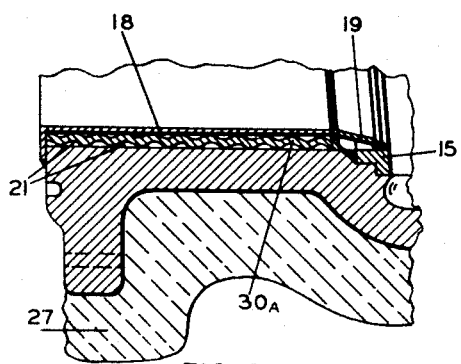
Figure 3:
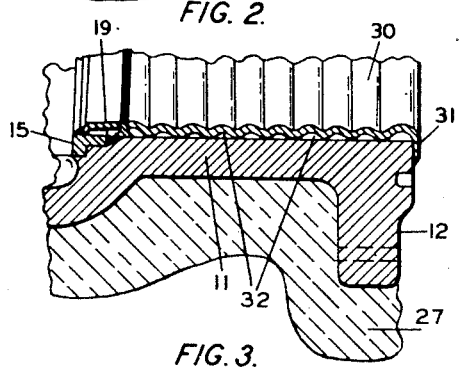
Figure 4:
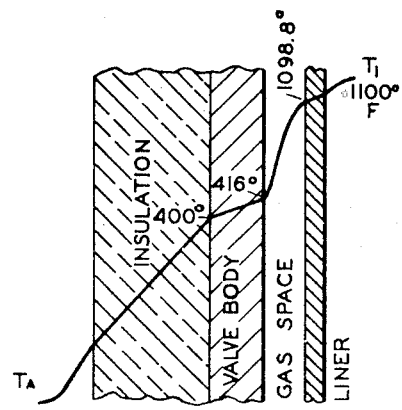

Still other objects and advantages will be apparent to those skilled in the art from a careful study of the following detailed description, in which Figure 1 of the drawing represents, diagrammatically, one embodiment of my valve structure. Figures 2 and 3, also represent variable or equivalent valve structures embodying the same underlying principle. Figure 4 is a plot showing the temperature relation of the various metal surfaces of a valve body embodying my invention.

In the figures of the drawing, numerals refer to the same or to corresponding parts.

Referring particularly to Figure 1, numeral 11 refers to a valve housing or body having end flanges 12 for attachment to sections of pipe or to other valves or pipe fittings. As illustrated in this embodiment, this valve is a gate type valve, having a split gate 13, that is a wedge shape circular gate in two sections as indicated by 13a and 13b. This gate is raised and lowered by a conventional hand wheel bonnet assembly, not shown, through a valve stem 14. The bonnet is attached to the valve body by means of the upper flange 16. When the gate 13 is in its lowered or closed position sealed or fluid tight contact is made with seat rings 15. These seat rings are standard parts or members of conventional type gate valves and are ordinarily threaded and screwed into place or may be welded in place, both these methods being in common practice.

When such a valve, that is, one composed of a body member, gate seats, and a gate, is in intermittent high temperature service, thermal strains may be excessive. When such a valve is at atmospheric temperature and upon opening a fluid of 900–1100° F. begins to flow, it is obvious that the valve body undergoes terrific strains. My experience has been that valves in such service fail by developing cracks. Such conditions are magnified when valves are used in cyclic service, as in catalytic conversion operations where "on stream" periods are high temperature and "off stream" or closed periods are at substantially atmospheric temperature. Frequent failures under such conditions are evidenced by development of cracks in the flanged ends of the body in the vicinity of positioning grooves 17. Obviously when cracks develop in any part of a valve, especially if in high pressure service, the valve is unsafe and unfit for further use. Housings or bodies of corrosion resistant alloys may cost into the thousands of dollars depending on the size, for example a 6 inch valve body only of corrosion resistant alloy is estimated to cost one thousand dollars, a 10 inch valve body one thousand five hundred dollars. Thus, it is obvious that if my invention makes possible increased life of such valve bodies, and in these times of material shortages, such an advantage is of the utmost importance.

It might be mentioned that many other cracks develop in such valves other than in the immediate vicinity of the positioning grooves 17, mentioned above.

One step in the protection of such valve bodies is to insulate the bodies so that during the "off-stream" portion of a cycle the body will remain comparatively hot so that when the valve is opened to the flow of high temperature fluid, the temperature rise will not be so great. The life of such valve bodies has been materially lengthened when insulated as indicated in Figure 1.

As a further protective means I have found that a liner inserted at a spaced distance from the valve body wall, increases valve life still further. The object or reason for an increased life is due to the insulating effect of the air or gas space left between the liner and body wall.

In the embodiment illustrated in Figure 1, the liner is composed of two parts, a sleeve member 18 and a conical member 19. For illustrative purposes I have assumed the liner of Figure 1 as a $\frac{1}{16}$ inch thick hollow cylindrical member being so designed and made as to slip into place leaving a predetermined air space between the liner and the valve walls. To support the liner 18 I provide a series of "rings" 20. These rings may best be installed in the valve housing or body by welding, for example, prior to insertion of the liner 18. As an alternative means of forming insulating gas spaces 21, the rings (20) may be made by turning in a lathe, and cutting away portions of the valve body excepting those to be left as the rings. By whatever method the spacing means 20 is provided is immaterial, all that is necessary is to provide a mechanically strong and thermally suitable spacing means. The valve "gate" end of the liner 18 may be beveled or cut at an angle determined by the "wedge angle" of the valve gate. The liner may be welded in place by any method suitable for the purpose at hand taking into account materials of construction and other conditions understood by those skilled in such art.

The conical or tapered liner members 19 are inserted on each side of the "gate" to act as protectors and provide insulating gas spaces adjacent the valve seat rings 15. These rings 15 may be threaded and screwed into place or preferably may be welded. The latter method makes certain that the seat rings remain rigidly attached to the valve body. Such welding metal is indicated by the filled triangular spaces 22 in Figure 1. Since the machined and smooth face of the seat member must not be covered nor interfered with in any manner, the conical member 19 is countersunk into the valve body conduit with respect to the valve seat, and this member (19) is so constructed as to provide a gas space 23 similar to the other insulating spaces 21. The adjacent ends of the conical member 19 and the liner 18 may be rigidly fixed to the valve body by welding as indicated by a ring of weld metal 24.

The outer end of the liner member 18 is flanged to permit welding to the flanges of the valve body, the weld being indicated by weld metal 25. In like manner the flanged end of the conical member 19 is welded to the valve seat member 15 as indicated by reference numeral 26 in such a manner that the weld metal does not interfere with the seating of valve gate. Thus such welding seals the annular cavities 23 between the conical member 19 and the valve body, and the cavities 21 between the sleeve member 18 and the valve body and makes said annular spaces substantially gas tight. While during the several mentioned welding operations gases will be sealed into these annular spaces 21 and 23 there will be no free flowing of fluids into or out of these spaces during operation of the valve thus according more efficient insulation means.

To assist in maintaining more nearly uniform temperature throughout the valve body, I prefer to insulate the valve body with suitable insulation material as indicated by reference numeral 27.

While in the above description of the embodiment shown in Figure 1, I have disclosed the use of a plain smooth cylindrical insulating sleeve and means for supporting same, this particular form of sleeve and support is not critical since other forms are found to be useful and some even advantageous. Other embodiments of the sleeve and support members (18 of Fig. 1) are illustrated in Figures 2 and 3.

In Figure 3 is shown a sufficiently large portion of a valve body and insulating member, in section, as to illustrate a second embodiment of my invention. This embodiment includes a seat member 15 and a conical insulating member 19 similar to those described hereinbefore in relation to Figure 1. In place of a smooth surfaced sleeve member (as 18 in Figure 1) a corrugated sleeve member 30 is used. This member is in general cylindrical in shape and has a flanged outer end 31 for welding to the valve body flange. Both ends of this corrugated member 30, the conical member 19 and seat member 15 are welded in place in a manner similar to that described for the assembly of Figure 1. In place of rings 20 of Figure 1 for forming the annular shaped gas spaces 21, in the embodiment of Figure 3, the corrugations make corresponding annular insulating spaces 32.

In Figure 2 is shown an embodiment of my invention incorporating the corrugated sleeve member 30 of Figure 3 and the smooth, cylindrical sleeve member 18 of Figure 1. The corrugated sleeve member 30a in this embodiment is intended to be the equivalent of the rings 20 of Figure 1, that is, to serve as the support for the cylindrical sleeve member 18 and at the same time to provide the annular insulating spaces 21. In this instance the corrugated sleeve member 30a need not be welded into place since the welding of sleeve 18 serves this purpose. Thus the sleeve member 18 has an exterior flange for attaching to the valve body flange, and the corrugated sleeve 30a has none. Conical member 19 and the valve seat ring 15 are similar to those of Figures 1 and 3. By using said corrugated sleeve in this manner, double the number of annular gas spaces are provided as in the other embodiments with accordingly better heat insulating properties.

To illustrate the advantage and utility of my method of controlling high temperature valve temperatures, I have made standard calculations showing the temperature drop through the liner sleeve 18 of Figure 1, across the gas space 21 and through the valve body 11. For purposes of calculation I assume the valve to be in a high temperature service carrying a fluid at 1100° F. and having an exterior valve body temperature of 400° F. With an alloy, chemically non-corrosive liner 1/16 of an inch thick carrying a fluid at 1100° F. the temperature of the exterior surface of the liner is approximately 1098.8° F. Assuming a 1/16 inch air gap, the temperature drop across this air gap is 683° F., thus the temperature at the exterior surface of the air space is 1098.8−683=415.8° F. or approximately 416°. A valve body of the same alloy metal as the sleeve member but of 0.875 inch thickness experiences a temperature drop of 16° between its interior and exterior surface. To illustrate these temperature differentials, reference should be made to Figure 4 of the drawing, which is self-explanatory.

It will be noted that the temperature of the interface between the valve body and the insulation is taken at 400° F. for the above mentioned calculations. This value was not just arbitrarily assumed since it is in reality an operational temperature. It was found that when such a valve was open to 1100° F. fluid, the outer surface of the valve body after a while reached a temperature very near 1100° F. Then, when the valve was closed for an off-stream portion of a cycle, the valve slowly cooled and after four hours the temperature of the valve body-insulation interface was approximately 400° F. At the end of the four hour off-stream period, upon opening the valve to 1100° F. fluid a thermal shock occurred. The liner quickly became heated to the 1099° F. (as calculated), then because of the 1/16 inch air gap the interior of the valve body became only slowly heated to about 416°, the exterior of the metal body remaining at the 400° F. until the 416° F. temperature of the inner body is exceeded at which time the exterior surface temperature increases, finally approaching the 1100°. Thus it is obvious that the maximum thermal shock occurs at a time when the temperature difference between the inside of a valve and exterior is the greatest. It is obvious, too, that when a valve body is made of one thickness or layer of solid metal as is conventional in valve construction the thermal shock is severe. I have found that a valve containing a liner as herein disclosed suffers comparatively little from such a shock even when operating intermittently at high temperature.

The corrugations of the liner illustrated in Figure 3 are shown as transverse with respect to the longitudinal axis of the valve body, they, however, may be disposed longitudinally. This latter arrangement might be considered advantageous since it is obviously more conducive to streamlined flow.

In like manner the corrugations of the supporting liner 30a of Figure 2 may be arranged at right angles to the direction shown, or may be arranged helically or according to other design as desired, the several requirements of strength of construction and provision of air spaces being the important requirements. The rings 20 of Figure 1 may also be replaced by metal strips arranged longitudinally with respect to fluid flow.

Materials of construction of such valves as herein disclosed may be chosen from among those commercially available. This type of valve mechanism was found advantageous especially when corrosion resistant metal was used since such metal has a relatively high thermal coefficient of expansion, and my valve was found to offset at least some of the disadvantages of high expansion metals.

Having disclosed my invention, I claim:

A valve for use with high temperature fluids comprising a valve body forming two coaxial passagewalls spaced apart therein at their inner ends, the adjacent inner ends of the walls of said passages being flared outwardly so as to form enlarged passage portions; imperforate flared liner members, smaller in diameter than said flared passage portions, spaced from the walls of said enlarged passage portions and rigidly affixed at their inner ends to the inner ends of said enlarged passage wall portions so as to form gas tight seals therebetween; annular support members disposed along the length of each said passage wall and rigidly affixed thereto so as to form gas tight seals; and imperforate liner members extending from the outer ends of said flared liner members to the outer ends of said passages, being affixed at their inner ends to said flared liner members so as to form gas tight seals and secured in said annular support members so as to form a plurality of substantially gas tight chambers between said passage walls and said liners.

SHELBY D. LAWSON.

REFERENCES CITED

The following references are of record in the file of this patent:

UNITED STATES PATENTS

| Number | Name | Date |
|---|---|---|
| 951,342 | Sherwood | Mar. 8, 1910 |
| 1,006,640 | Faget | Oct. 24, 1911 |
| 1,213,259 | Redding | Jan. 23, 1917 |
| 1,746,132 | Stokes | Feb. 4, 1930 |
| 1,995,727 | Wetherbee | Mar. 26, 1935 |
| 2,062,781 | DeBaufre | Dec. 1, 1936 |
| 2,217,643 | Rude | Oct. 8, 1940 |
| 2,338,452 | Munters | Jan. 4, 1944 |
| 2,352,799 | Newton | July 4, 1944 |